United States Patent [19]
Zeiders, Jr. et al.

[11] 3,783,685
[45] Jan. 8, 1974

[54] HIGH POWER LASER ENERGY MEASURING DEVICE

[75] Inventors: Glenn W. Zeiders, Jr., Boston; Richard A. Hella, Andover, both of Mass.

[73] Assignee: Avco Corporation, Cincinnati, Ohio

[22] Filed: Aug. 23, 1972

[21] Appl. No.: 282,901

[52] U.S. Cl. .............................................. 73/190 R
[51] Int. Cl. ........................................... G01h 17/00
[58] Field of Search ............................. 73/190, 355; 250/83.31 R

[56] References Cited
UNITED STATES PATENTS

| | | | |
|---|---|---|---|
| 3,596,514 | 8/1971 | Mefferd et al. | 73/190 |
| 3,179,802 | 4/1965 | Hall, Jr. | 73/355 |
| 3,461,290 | 8/1969 | Webb | 73/355 |
| 3,561,265 | 2/1971 | Schmidt | 73/190 |
| 3,222,522 | 12/1965 | Birkebalt | 250/833 |

OTHER PUBLICATIONS

Neill, Jr., "High-Energy Light Detector for Use with Pulsed Ruby and Glass Lasers", in Applied Optics, Vol. 9, No. 10, Oct. 1970, pp. 2392,2393.

Glaser, "High Radiation-Flux, Absolute, Water Flow Calorimeter", in Review of Scientific Inst., 28(12), pp. 1084-1086, Dec. 57.

Li et al., "A Calorimeter for Energy Measurements of Optical Masers", in Applied Optics, Vol. 1, No. 3, May 1962, pp. 325-328.

West et al., "Theory of Isoperibol Calorimetry for Laser Power and Energy Measurements", in Journal of Applied Physics, Vol. 41, No. 6, May 1970.

*Primary Examiner*—Herbert Goldstein
*Attorney*—Charles M. Hogan et al.
*Attorney*—Charles M. Hogan and Melvin E. Fredericks

[57] ABSTRACT

Apparatus for measuring high power laser output by calorimetric means, wherein the laser beam whose energy is to be measured is directed within a hollow container. The beam within the container is redirected to evenly illuminate the interior surface of said container. The temperature rise of the container is measured and the effective energy of the incident beam is thereby determined calorimetrically.

6 Claims, 6 Drawing Figures

PATENTED JAN 8 1974 3,783,685
SHEET 1 OF 3
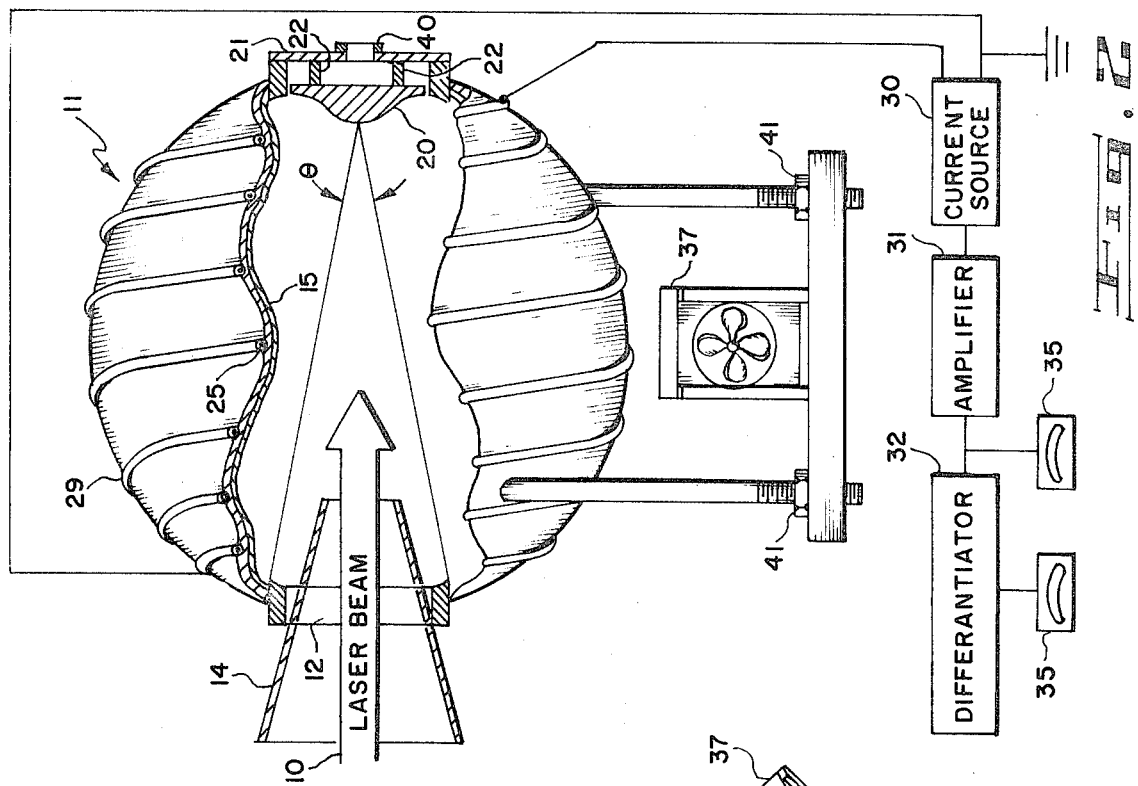
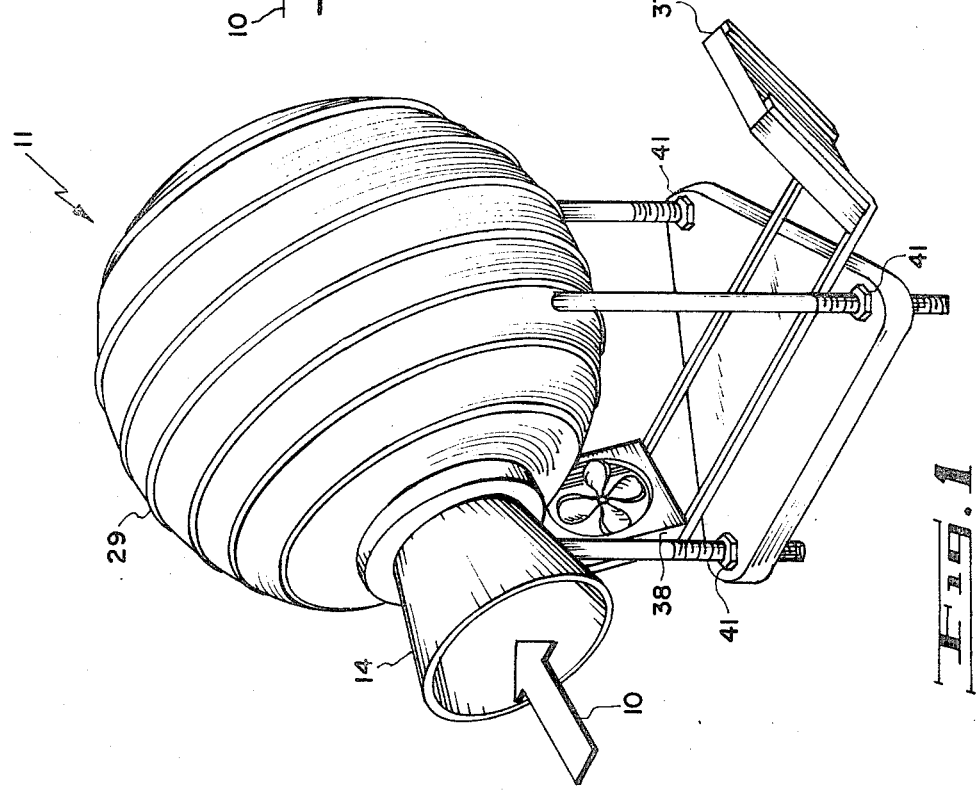

HIGH POWER LASER ENERGY MEASURING DEVICE

BACKGROUND OF THE INVENTION

1) Field of Invention

The present invention relates generally to power or energy measuring devices and more particularly to apparatus for measuring high power laser energy by calorimetric techniques.

2) Description of the Prior Art

Previous power measuring devices have generally been restricted to either low power or low energy applications, or, in the case of high power designs, have generally relied upon one or more reflections from an absorbing water-cooled surface, the power being measured by the temperature rise of the flowing coolant. The latter designs are characterized by questionable absorption coefficients (due to the difficulty of calibration without high power illumination of the proper wavelength), relatively long time response, and the potential danger of undesirable feedback to a high-gain laser medium.

As indicated, the prior art devices for measuring high power laser energy use the temperature rise of a flowing coolant to indicate the incident energy. This necessitated the use of large cumbersome devices containing complicated water jacketed structures and multi-path optical arrangements. The inherent problems of such devices involved highly questionable calibration techniques due to questionable absorption coefficients as well as relatively long times necessary to make a particular measurement. Further, spurious modes might be generated in such devices which could seriously damage the laser cavity by reflection back into the laser source.

SUMMARY OF THE INVENTION

According to the present invention, a heat sink, large-diameter, metallic sphere with a highly absorbing internal coating is envisioned. The incident laser beam, the energy of which is to be measured, is reflected from a mirror having a surface contoured so as to spread the power over the instrumentation sphere at an intensity level below the damage value of the sphere. Since unexpected spatial power variations can produce uneven heating of the shell, the sphere is closely wound with a long continuous wire so that the temperature rise is effectively integrated over the surface. Rapid thermal response is assured by wrapping thinly-insulated wire in deep grooves and potting in place with a thermally-conducting epoxy, the wire being chosen to have a linear resistance versus temperature variation. The change in resistance is measured by standard commercial means to determine the amount of the energy of the incident beam. Further, the time derivative may be taken to obtain the power level of the incident beam. Therefore, the object of the present invention is to provide an apparatus to measure high power laser energy calorimetrically.

A further object of the invention is to provide a small compact apparatus which does not require the use of high coolant flowing liquid.

A further object is to produce a measuring device which produces minimal losses.

A further object is to provide an apparatus wherein the risk or danger of undesirable feedback into the laser medium is very low or significantly reduced over that present in prior art devices.

Another object is to provide a simple temperature measuring instrument which produces a rapid time response for measuring the absorbed energy.

Another object is to provide an apparatus which will not be subject to damage by high absorbed radiant energy flux.

DESCRIPTION OF THE DRAWINGS

For a better understanding of the invention together with other and further objects, advantages and capabilities thereof, reference is made to the following description of the appended drawings wherein:

FIG. 1 is a perspective of the apparatus in accordance with the invention;

FIG. 2 is a side view with parts broken away of the apparatus with associated electronics in accordance with the invention;

FIG. 3 is a segment of the wall of the apparatus illustrating an alternative embodiment;

DESCRIPTION OF THE PREFERRED EMBODIMENT OF THE INVENTION

Figure 5:
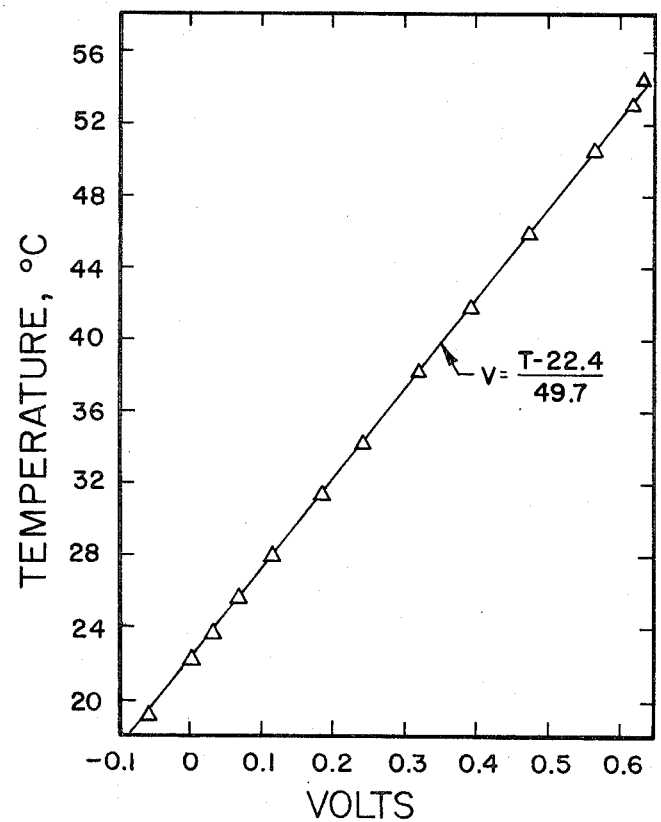
FIG. 5 is a graph indicating a typical calibration curve of the apparatus.

The specification now proceeds to a description of a preferred form of the apparatus for measuring high power laser beams in accordance with the invention.

Attention is directed to FIGS. 1 and 2 wherein the laser beam 10 whose energy is to be measured is shown entering a spherical shaped container generally designated 11. The container 11 is fabricated of a heat absorbing material with a high thermal conductivity such as aluminum. The inner surface of the spherical container is coated with a highly absorbing material 15 such as Nextel 101-C10 Black Velvet paint manufactured by Minnesota Mining and Manufacturing Company. The incident beam 10 passes through a circular opening or aperture 12 on one side of the container 11. If beams of larger diameter than the diameter of the aperture 12 are to be measured, the cone 14 provides a mechanism whereby the laser beam diameter may be effectively reduced to a diameter which can be handled by the diameter of the aperture 12.

After entering the container 11, the beam 10 impinges on the contoured diffusing mirror 20 which is removably positioned on the wall axially opposed to the aperture 12. The diffusing mirror 20 is constructed of material such as copper which will absorb very little incident radiation. The diffusing mirror 20 is provided with a highly reflective surface contoured such that all energy impinging on its surface will be spread across the surface of the walls within the sphere while avoiding reflection back into the laser source. The design of the mirror 20 is more fully described hereinafter. Since the mirror 20 has appreciable thermal mass, it should be mounted away from direct thermal contact with container 11. This may be accomplished such as by attaching mirror 20 to plate mount 21 using bushings 22.

Figure 4:
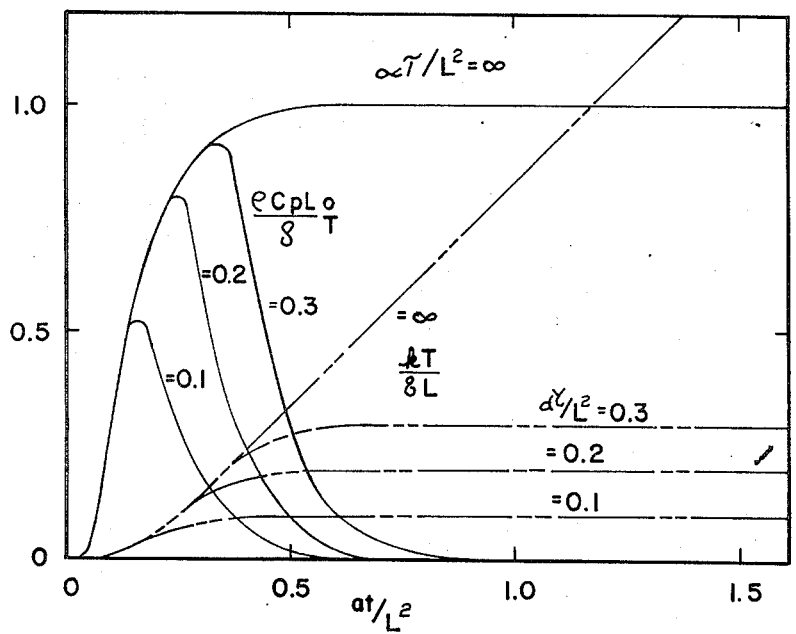
FIG. 4 is a graph indicating the time response of heat energy to propagate through the apparatus.
Figure 5:
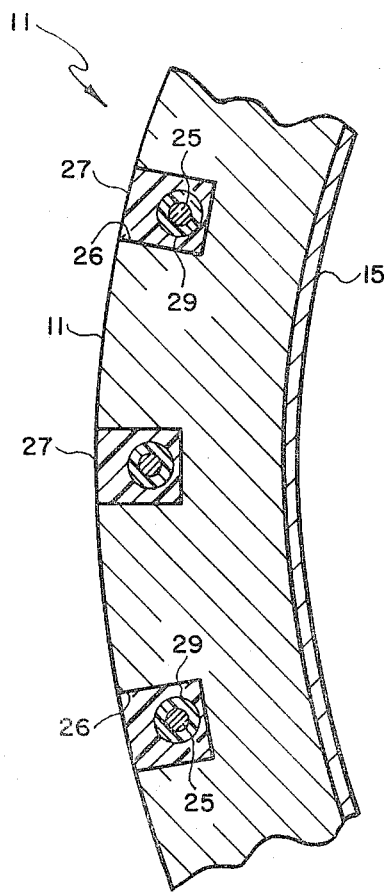

The laser energy which is reflected from the mirror 20 is absorbed by the walls of the container. Since unexpected spatial power variations can produce uneven heating of the shell 11, the sphere is closely-wound with a long continuous electrically conductive wire 25 so that the temperature rise will be sensed by a number of windings. The heat rise measured in these windings is averaged over the entire length of wire and thereby effectively integrates the heat generated over the whole surface of the container 11. The electrically conductive wire 25 having a thin non-conductive coating 29, is chosen to have a linear resistance versus temperature variation such as Number 38 nylon-coated copper wire. Wire 25 may be wrapped around the outer surface of the container 11 as illustrated in FIGS. 1 and 2. If the wire is wrapped around the outer surface of container 11, the time response for the heat energy to be measured is the greatest. This time lag is due to the time required for heat to propagate through the wall thickness of the container. The time response of the instrumentation with external wiring has been calculated and illustrated in FIG. 4 for an absorbed constant intensity pulse of magnitude (q) and duration ($\tau$) in a shell of thickness (L) with thermal conductivity (k) and thermal diffusivity $\alpha = k/\rho C_p$, where ($C_p$) is the heat capacity and ($\rho$) is density. FIG. 4 illustrates the time delays inherent in winding the temperature sensitive wire externally around the spherical container. The first set of curves (solid lines) indicate the time rate of temperature change of the external wall for pulse times $\tau/L^2 = 0.1, 0.2, 0.3,$ and $\infty$. The other set of curves (broken lines) indicates the temperature change of the external wall. The time derivative of the temperature, proportional to the flux (q) or power (P), reaches its equilibrium value in a time $t_o \approx 0.6 L^2/\alpha$.

The above described measurement may be made more rapidly by wrapping thinly insulated wire 25 in deep grooves 26 and potting in place with thermally conducting epoxy 27 as illustrated in FIG. 3. The equilibration time ($t_o$) will be less than $0.6L^2/\alpha$ with this embodiment and the fragile wire will be protected from damage in handling. The calibration and operation of the calorimeter is discussed in detail hereinafter.

To measure the energy (E) and power level $P = dE/dt$, the resistance wire 25 is supplied with a constant current from constant current source 30 as shown in FIG. 2. The output voltage signal indicates the change in resistance due to the heat rise in the calorimeter. The signal from the current source 30 may be amplified by amplifier 31 to provide a direct reading of voltage change due to the change of resistance of wire 25. This voltage change is indicated at measuring device 35 such as a precision voltmeter and/or chart recorder which measures the energy applied to the calorimeter. A voltage null circuit may be incorporated in the current source 30 for increased sensitivity. Further, when the amplified signal is differentiated by a differentiator 32 such as, for example, a fast response resistive-capacitive (RC) circuit, a direct reading of the temporal voltage change is indicated at device 35. This time dependent voltage change is proportional to the mean power, averaged locally over the equilibration time $t_o$. Between each measurement the calorimetric shell may be returned to ambient conditions by use of high output fans 37 and 38 or otherwise suitably cooled if desired.

In order to obtain a direct readout of energy indicated above, the instrumentation must be calibrated. The calibration may be accomplished by filling the sphere with heated water (not shown) and swirled to achieve uniformity. The final water temperature is measured with an accurate thermometer and the voltage output of the constant current source measured at the measuring device. Typical data taken by such a technique is illustrated in FIG. 4 from which the response ($\Delta T$) was for the embodiment tested found to be 49.7° C/volt with the voltmeter set on the 0.1 volt ohm scale. Using the weight of the shell ($m$) and a specific heat ($C_p$) of 0.215 Btu/lb° F (characteristic for aluminum alloy), the energy calibration is $E = mC_p\Delta T = 618$ kilojoules/volt.

To obtain a direct readout of power, the differentiator RC circuit may be calibrated by applying a voltage divided output of an oscilloscope sawtooth generator directly into the input of the differentiating circuit. The input and output voltage histories may be monitored on any commercially available oscilloscope. The results of such tests indicate that the output reached ninety percent of its final value in approximately 0.2 seconds, then rose relatively slowly to an asymptotic value of 1.56 volt/volt/second or 0.078 volt/ohm/ second. Since the calorimeter tested had a time constant of the order of 0.7 seconds, the electronics do not impose any time limitations on obtaining accurate measurements. By using the measured time constant of the electronics, the power calibration was found to be 78 kilowatt/volt.

The device should be properly aligned with incoming laser beam prior to making any measurements while the high power beam is turned off. The alignment may be accomplished by utilizing a low power He-Ne laser (not shown) which is external and bore sighted along the center line of the high power beam to be measured. After the low power laser is bore sighted, the calorimetric container is placed between the He-Ne laser and the laser source. A planar mirror 40 on the back of the container allows an operator to position adjusting bolts 41 until the mirror is in position to reflect the He-Ne laser energy back on itself. This back-sighting technique is used to accurately align the diffusing mirror and the container with the incoming laser beam, such an alignment assures proper distribution of the laser energy throughout the interior of the calorimetric shell when the high power beam is turned on.

Figure 6:
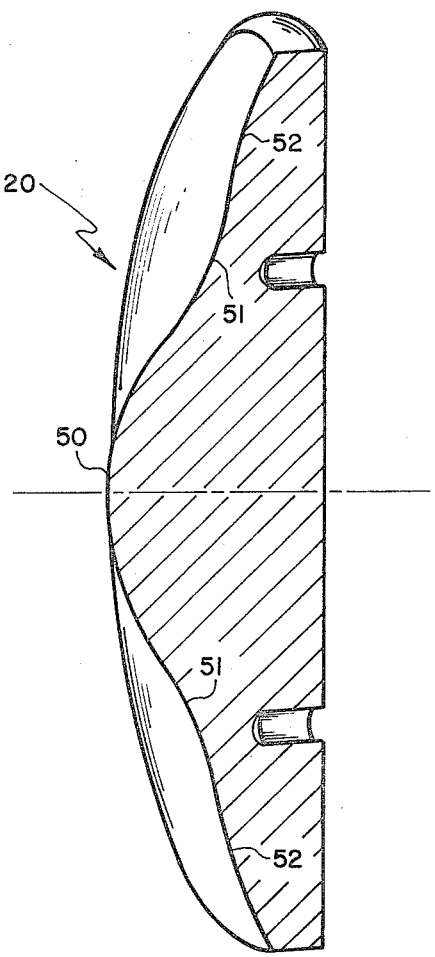
FIG. 6 is a cross-sectional view of the reflecting mirror component of the apparatus.

Attention is directed to FIG. 6 which illustrates the design of a diffusing mirror 20. The curvature of the surface of the mirror is critical in order to reflect the input beam throughout the interior of the container 11 without causing any back reflection through aperture 12. The mirror 20 shown in FIG. 6 is designed to reflect the incident radiation throughout the calorimetric sphere by any section or element of the mirror surface which may be either convex or concave. If laser radiation is incident over the whole mirror surface, the mirror is designed such that each section of the mirror will distribute all incident radiation throughout the sphere. Each section is contoured by employing physical optical analysis employing standard geometric ray tracing techniques to insure that all the radiation is retransmitted throughout the calorimetric sphere. For example, the mirror 20 shown in FIG. 6 is divided into three sections: the inner section 50; the middle section 51; and the outer section 52. The surface of section 50 is convex such that all the laser radiation incident on section 50 is distributed evenly throughout the interior surface of the calorimetric sphere. The surface of section 51 is concave such that all the laser radiation incident on section 51 is distributed evenly throughout the interior surface of the calorimetric sphere. The surface of section 52 is convex such that all the laser radiation incident thereon is distributed evenly throughout the interior surface of the calorimeter sphere.

As described above the preferred embodiment of the mirror comprises three elements, each element capable of reflecting all the incident radiation thereon throughout the calorimetric shell. The preferred configuration has the advantage that a small diameter beam incident only on one element will be dispersed over a large area of the interior surface of the shell rather than concentrated by a single element mirror which will tend to concentrate the reflected beam over a smaller area. Furthermore, large diameter incident beams are divided into three bundles of radiation each of which is spread across a whole area of the calorimeter. Depending on the particular application and beam diameter, it is envisioned that mirrors with one element could be utilized.

The various features and advantages of the invention are thought to be clear from the foregoing description. Various other features and advantages not specifically ennumerated will undoubtedly occur to those versed in the art as likewise will many variations and modifications of the preferred embodiment illustrated, all of which may be achieved without departing from the spirit and scope of the invention defined by the following claims.

What is claimed is:

1. Apparatus for measuring the energy of a laser beam comprising:
    a. a spherical, heat conductive hollow container means having an aperture for admitting said laser beam into said container;
    b. mirror means within said container axially aligned with said aperture and disposed on the wall opposite said aperture for receiving said laser beam and reflectively distributing said beam throughout substantially only the interior surface of said container, whereby said container is heated by the absorption of laser energy by said container, said mirror means having an annular concave portion surrounding a convex center portion, said mirror portions being effective to reflectively distribute a laser beam incident thereon substantially uniformly throughout the interior surface of said container and substantially preventing reflection through said aperture;
    c. sensor means comprising a continuous linear temperature sensitive electrically insulated electrical conductor wrapped uniformly around and in thermal contact with said container for providing an output signal proportional to variations in the temperature of said container means; and
    d. indicator means for displaying said output signal.

2. Apparatus as defined in claim 1 in which said container means includes a collector cone for increasing the effective aperture size.

3. Apparatus as defined in claim 1 wherein the interior surface of said spherical container comprises a highly absorbing opaque material.

4. Apparatus as defined in claim 1 wherein said sensor means includes a constant current source and amplifier for measuring the change in electrical resistance of said wire thereby providing a direct reading of energy of said incident beam.

5. Apparatus as defined in claim 4 wherein said sensor means includes a differentiator circuit for measuring the rate of change of the electrical resistance of said wire thereby providing a direct reading of power of said incident beam.

6. Apparatus for measuring the energy of a laser beam comprising:
    a. a hollow thin wall spherical container having an aperture for admitting said laser beam into said container; said container being constructed of highly heat conductive material and coated internally with a thin layer of highly absorbing opaque material;
    b. mirror means axially aligned with and opposite said aperture, said mirror means being disposed adjacent the wall opposite said aperture and having a central convex portion, and intermediate annular concave portion surrounding said convex portion and an outer annular convex portion surrounding said annular concave portion, said portions being contoured and located to receive said laser beam from said aperture and reflect said beam substantially only throughout the interior surface of said container, said reflected beam impinging on and being absorbed by said container whereby said container is caused to be heated;
    c. sensor means including continuous electrically conducting wire closely wound, evenly spaced, in thermal contact with, and electrically insulated from said container; said wire having a resistance characteristic substantially linearly responsive to temperature change of said container; and
    d. monitoring means including a constant current source and amplifier for measuring the change in resistance of said wire resulting from heating by the absorption of energy of the incident beam of radiation entering through said aperture.

* * * * *

PO-1050
(5/69)

UNITED STATES PATENT OFFICE
CERTIFICATE OF CORRECTION

Patent No. 3,783,685             Dated January 8, 1974

Inventor(s) Gelnn W. Zeiders, Jr. and Richard A. Hella

It is certified that error appears in the above-identified patent and that said Letters Patent are hereby corrected as shown below:

Column 1, line 55, after "of" (first occurrence), please insert--heat generated. The amount of heat generated gives a direct indication of--; and Column 3, line 27, for "$\tau/L^2$", read--$\alpha\tau/L^2$--.

Signed and sealed this 17th day of September 1974.

(SEAL)
Attest:

McCOY M. GIBSON JR.             C. MRSHALL DANN
Attesting Officer                 Commissioner of Patents